(12) United States Patent
Frank (10) Patent No.: US 6,674,441 B1
(45) Date of Patent: Jan. 6, 2004

(54) METHOD AND APPARATUS FOR IMPROVING PERFORMANCE OF AN ACCELERATED GRAPHICS PORT (AGP) DEVICE

(75) Inventor: Michael Frank, Sunnyvale, CA (US)

(73) Assignee: ATI International, SRL, Barbados (KN)

( * ) Notice: Subject to any disclaimer, the term of this patent is extended or adjusted under 35 U.S.C. 154(b) by 369 days.

(21) Appl. No.: 09/625,581

(22) Filed: Jul. 26, 2000

(51) Int. Cl.$^7$ ................................................ G06F 15/16
(52) U.S. Cl. ...................... 345/503; 345/519; 345/520; 711/206; 711/207
(58) Field of Search ................................ 345/557, 503, 345/519, 520; 711/206, 207, 208, 209

(56) References Cited

U.S. PATENT DOCUMENTS

| | | | | | |
|---|---|---|---|---|---|
| 6,065,104 | A | * | 5/2000 | Tng | 711/209 |
| 6,189,074 | B1 | * | 2/2001 | Pedneau | 711/139 |
| 6,215,497 | B1 | * | 4/2001 | Leung | 345/419 |
| 6,330,654 | B1 | * | 12/2001 | LaBerge et al. | 711/207 |
| 6,385,712 | B1 | * | 5/2002 | Campbell | 711/206 |
| 6,442,666 | B1 | * | 8/2002 | Stracovsky | 711/206 |
| 6,538,650 | B1 | * | 3/2003 | Prasoonkumar et al. | 345/419 |

* cited by examiner

Primary Examiner—Matthew C. Bella
Assistant Examiner—Mackly Monestime
(74) Attorney, Agent, or Firm—Vedder, Price, Kaufman & Kammholz, P.C.

(57) ABSTRACT

A method and apparatus for improving performance of an AGP device is provided. In one embodiment of the invention, a second-level cache is provided for a TLB, and part of the data or part of the address that is not otherwise used for determining a TLB entry is divided by a prime number to determine which TLB entry to allocate. One embodiment of the invention provides the ability to load multiple cache lines during a single memory access without incurring additional transfer, storage, or management complexities. The full number of bits of each memory access may be used to load cache lines. One embodiment of the invention loads multiple cache lines for translations of consecutive ranges of addresses. Since the translations included in the multiple cache lines cover consecutive ranges of addresses, the relationship between the multiple cache lines loaded for a single memory access is understood, and additional complexity for cache management is avoided. Loading of multiple cache lines for translations of consecutive ranges of addresses also improves performance by increasing the number of translations available in the TLB. Moreover, locality of reference tends to make translations for consecutive ranges of addresses more likely to be relevant than translations for distant ranges of addresses.

15 Claims, 6 Drawing Sheets

METHOD AND APPARATUS FOR IMPROVING PERFORMANCE OF AN ACCELERATED GRAPHICS PORT (AGP) DEVICE

TECHNICAL FIELD OF THE INVENTION

The invention relates generally to computer graphics apparatus and processing and more specifically to memory management for computer graphics apparatus and processing.

BACKGROUND OF THE INVENTION

Traditional computing architectures had only one client, a central processing unit (CPU), accessing memory through a translation lookaside buffer (TLB). The TLB provides quick translations of virtual addresses used by the CPU to physical addresses used by memory for a limited number of such addresses. However, it is desirable to allow more than one client to access memory through a TLB. This provides all clients with the same view of the virtual address space. For example, it is desirable to allow a CPU and an advanced graphics port (AGP) device to access memory through a TLB. The AGP device may perform graphics processing while the CPU performs other processing. The multiple clients may include separate devices or a CPU switching from one process to another, for example, a video process, an audio process, and a user application process, etc.

One problem that arises is that least-recently-used (LRU) replacement strategies cause important information in the TLB to be replaced as different processes or devices access different areas in virtual address space for which an address translation has not been cached in the TLB. Thus, for example, when audio processing begins, information in the TLB that is important to video processing may be replaced with information important to audio processing, requiring the information important to video processing to be reloaded into the TLB when video processing resumes. Consequently, memory bandwidth is wasted while replacing and reloading information.

Several attempts have been made to avoid this problem. One approach has been to use a TLB large enough to accommodate the information needed by all of the different devices or processes. However, increasing the size of the TLB increases its complexity and cost while reducing its efficiency.

Another approach has been to use pipelining to attempt to solve the problem. Pipelining involves dividing a task, such as the processing of an instruction, into a number of sequential steps and processing different steps of different tasks concurrently. However, pipelining increases complexity and can introduce delays in processing under certain circumstances.

Another approach has been to give each of the multiple clients direct access to system memory. However, since the memory space is not contiguous, each of the multiple clients requires its own TLB structure. Thus, complexity is increased by duplication of the TLB structure.

As noted above, large TLB's typically suffer from complexity, cost, and efficiency problems. However, if such problems could be avoided, a larger TLB would be beneficial.

Thus, a technique to allow multiple clients to access memory through a TLB and to increase performance of an AGP device is needed.

DETAILED DESCRIPTION OF A PREFERRED EMBODIMENT

A method and apparatus for improving performance of an AGP device is provided. In one embodiment of the invention, a second-level cache is provided for the TLB. Thus, the TLB is organized at two levels. At a coarse level, a page table directory containing page table directory entries is provided. At a fine level, page tables containing page table entries are provided. The page directory entries serve as pointers to the plurality of page tables, and the page table entries serve as pointers to pages of data in the memory device. The cache for the page tables and the second-level cache for the TLB may be shared. However, to avoid unnecessary cache replacement (e.g., thrashing) resulting from aliasing of addresses between the directory cache and the second-level TLB cache, a mapping function is provided to allocate cache entries for the directory and the second-level TLB cache. The purpose of the mapping function is to spatially separate entries associated with the directory from entries associated with the page tables. One embodiment of the invention uses part of the data or part of the address that is not otherwise used for determining a TLB entry and divides it by a prime number to determine which TLB entry to allocate. For example, a 64-entry cache could be split into 11 entries associated with the directory and 53 entries associated with the page table, and the cache slot number to store entries would be determined according to the following:

If (cache_entry.type==page_table) then
    Cache_dentry.slot<=address modulo 11
Else
    Cache_entry.slot<=11 +(address modulo 53).

Expressed mathematically, if the variable address represents an address corresponding to an address translation and the variable directory_entries represents the number of entries associated with the directory, then an address translation associated with the directory is mapped to an entry_slot according to the following mapping function: entry_slot=address modulo directory_entries. If the variable total_entries represents the combined number of entries associated with the directory and the page table, the number of entries associated with the page table, page_table_entries, is represented as follows: page_table_entries= total_entries−directory_entries. Thus, an address translation associated with the page table is mapped to an entry_slot according to the following mapping function: entry_ slot=directory_entries+(address modulo page_table_entries). If the variable entry_slot_type has a value zero to indicate that the entry is a directory cache entry or a value one to indicate that the entry is a second-level TLB cache entry (i.e., page table entry in the TLB), the two mapping functions above may be combined into a single mapping function as follows: entry_slot=(not entry_slot_type)*(address modulo directory_entries)+(entry_slot_type)*(directory_entries +(address modulo page_table_entries)).

The entries associated with the directory and the entries associated with the page table need not occur in a particular order. For example, the mapping function may be as follows: entry_slot=(entry_slot_type)*(address modulo page_table_entries)+(not entry_slot_type)*(page_table_entries+(address modulo directory_entries)). Alternatively, a mapping function that interleaves entries associated with the directory with entries associated with the page table. For example, if directory_entries=page_table_entries, the following mapping function may be used: entry_slot=(entry_slot_type)*2*(address modulo directory_entries)+(not entry_slot_type)*(2*(address modulo page_table_entries)+1). Alternatively, the following mapping function may be used: entry_slot=(not entry_slot_type)*2*(address modulo page_table_entries)+(entry_slot_type)*(2*(address modulo directory_entries)+1). Mapping functions such as those described above avoid the aliasing problem and allow the directory cache and the second-level TLB cache to be stored together in a common storage structure.

A method and apparatus for increasing performance is provided that allows an increase in cache line size without a corresponding increase in complexity of cache management. In the past, TLB's typically used 32-bit cache lines. Since only one such cache line was relevant to a particular memory access, only that one relevant cache line was loaded during each memory access. Difficulties in transferring, storing, and managing larger amounts of information prevented the efficient use of larger cache lines. The inability to determine multiple relevant cache lines, as well as the transfer, storage, and management problems, prevented multiple cache lines from being efficiently loaded for a single memory access.

One embodiment of the invention provides the ability to load multiple cache lines during a single memory access without incurring additional transfer, storage, or management complexities. The full number of bits of each memory access may be used to load cache lines. For example, for a data bus that transfers 64-bits at each clock edge, the entire 128 bits transferred during a clock cycle (i.e., one rising clock edge plus one falling clock edge) may be used to transfer four 32-bit cache lines.

As noted above, one problem that has prevented the loading of multiple relevant cache lines for a single memory access has been the inability to determine which cache lines are relevant. One embodiment of the invention loads multiple cache lines for translations of consecutive ranges of addresses. Since the translations included in the multiple cache lines cover consecutive ranges of addresses, the relationship between the multiple cache lines loaded for a single memory access is understood, and additional complexity for cache management is avoided. For example, a single cache tag may be used to refer to a group of cache lines for translations of consecutive ranges of addresses. Thus, according to one embodiment of the invention, the number of cache lines available in the TLB may be multiplied several times without increasing the number of cache tags needed.

Loading of multiple cache lines for translations of consecutive ranges of addresses also improves performance by increasing the number of translations available in the TLB. Moreover, locality of reference tends to make translations for consecutive ranges of addresses more likely to be relevant than translations for distant ranges of addresses. Locality of reference refers to a characteristic of memory accesses where memory accesses in close temporal proximity tend to refer to addresses in close spatial proximity. Consequently, when one memory access relates to a specific address, subsequent memory accesses will often relate to addresses near that specific address. By loading multiple cache lines for translations of consecutive ranges of addresses, cache lines having a high probability of being relevant for subsequent memory accesses will already be in the TLB when those subsequent memory accesses occur. If the relevant cache line is already in the TLB, the need to load it from memory is obviated, thereby eliminating a processing step, conserving memory bus bandwidth, saving time, and increasing performance.

In one embodiment of the invention, the apparatus for improving performance of an accelerated graphics port (AGP) device comprises a graphics controller, a translation lookaside buffer operatively coupled to the graphics controller to store a smaller number of graphics controller address translations, a cache operatively coupled to the translation lookaside buffer to store a larger number of the graphics controller address translations, and a memory operatively coupled to the cache to store the graphics controller address translations.

The apparatus may include a CPU coupled to the TLB and a peripheral bus controller coupled to the TLB. In one embodiment of the invention, the TLB may include TLB entries of 128 bits. In one embodiment of the invention, the TLB includes tags of exactly 18 bits. The tag width may be based on the address space. For example, a 4 GB address space may be addressed using 32-bit addresses. The tag width may be defined as a portion of those 32 bits.

By utilizing a data bus having the capability of transferring 128 bits per clock cycle, the graphics controller causes the TLB to load three subsequent 32-bit TLB portions while a first 32-bit TLB portion is being loaded.

When a smaller number of graphics controller address translations is stored in the TLB and a larger number of graphics controller address translations is stored in the cache, one embodiment of the invention stores the larger number of graphics controller address translations in the cache according to a hashing function.

The invention may be implemented as a program storage device readable by a machine, the program storage device tangibly embodying a program of instructions executable by the machine to perform steps for improving performance of an AGP device. The AGP device may be included in or coupled to the machine.

In one embodiment of the invention, a two-level TLB structure for a page-oriented virtual memory system is provided. The TLB (cache) for the page table (i.e., the first-level of the two-level TLB structure) has a first-level cache and a second-level cache. For example, the first-level cache may be a relatively small and fully associative cache, while the second-level cache may be a larger, direct mapped cache, mapped according to a hashing function. The second level of the TLB (i.e., the page table directory) is also cached using a single-level directly-mapped cache arrangement. By sharing a common storage structure (e.g., a physical memory array) between the second-level cache of the page table and the single-level cache of the page table directory, the physical dimensions and the complexity of the circuits of the TLB as a whole may be reduced. The sharing may be accomplished by mapping the second-level cache of the page table to a first portion of common storage structure and mapping the single-level cache of the page table directory to a second portion of the common storage structure according to a mapping function.

Figure 1:
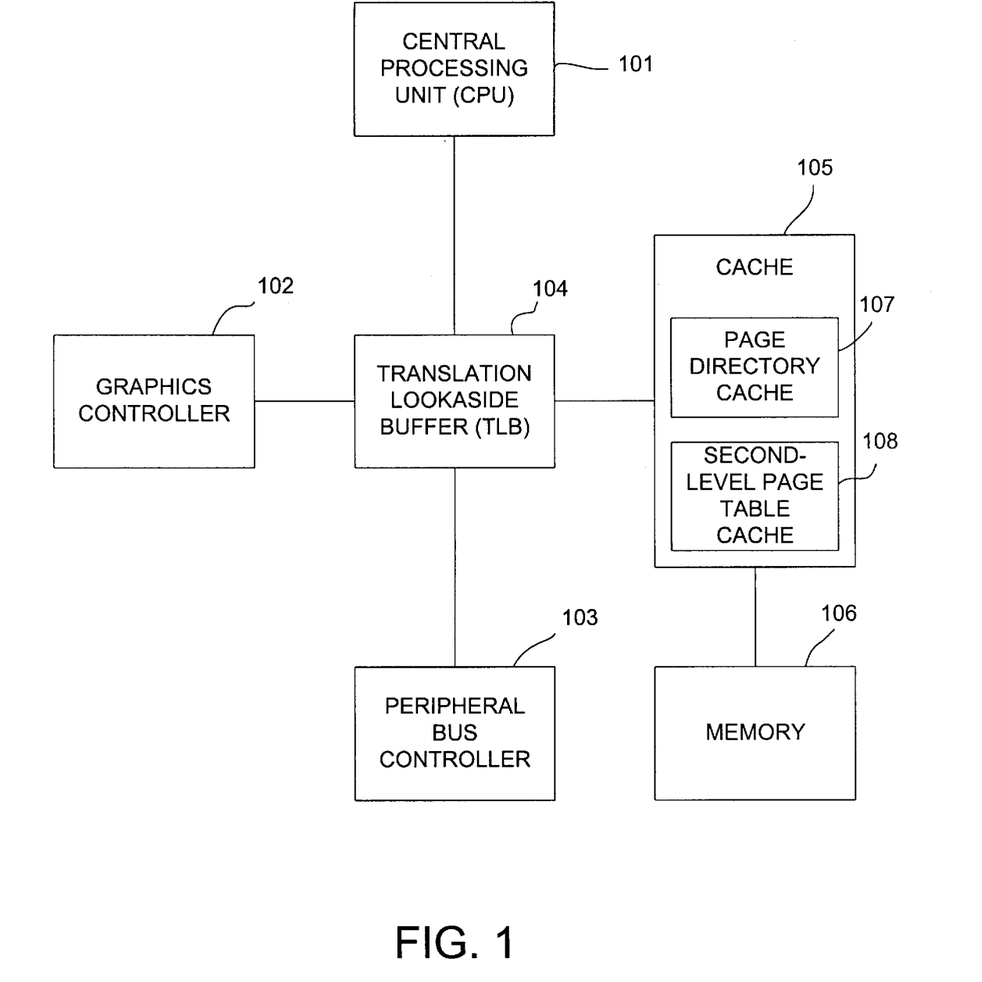
FIG. 1 is a block diagram illustrating apparatus in accordance with an embodiment of the invention.

FIG. 1 is a block diagram illustrating apparatus in accordance with an embodiment of the invention. CPU 101 is coupled to TLB 104. Graphics controller 102 is coupled to TLB 104. Peripheral bus controller 103 is coupled to TLB 104. TLB 104 is coupled to cache 105. Cache 105 includes directory cache 107 and second-level cache 108. Cache 105 is coupled to memory 106.

Optimal configuration of the cache 105 involves a number of factors. For example, the spatial locality and temporal locality of accesses should be considered. Also, caches tend to be more efficient if the cache lines are longer. While some types of caches are associative in that they store the addresses as well as the data, such caches tend to be complicated, expensive, and slow because all addresses must be searched for every access. While TLB's are typically fully associative and fully associative caches tend to perform better by increasing the hit rate, their complexity generally reduces the speed (clock rate).

In one embodiment of the invention, a direct mapped cache is provided for the TLB. The TLB is organized at two levels. At a coarse level, a page table directory is provided that may, for example, include 1024 entries of 4 bytes, where each entry references a page table. At a fine level, a page table is provided that may, for example, include 1024 entries of 4 bytes. Thus, the page table directory and each page table may each have a size of 4096 bytes, for example, which is equal to the size of a 4 kB page.

The use of a TLB organized at two levels allows dynamic management of page table entries.

The two levels of the TLB may be configured to share the same space. For example, cache 105 may be used as a common storage structure. However, aliasing between the two levels can lead to unintended and overly frequent replacement, which is sometimes referred to as thrashing. To avoid this, instead of using addresses to determine where to store data in the TLB, a mapping function may be used to map data to TLB entries. Part of the data being stored or part of the address of the data may be used to determine an index to TLB entries. The index may be determined by dividing by a prime number. If the indicated location is already taken, the data may be stored in the next available location, or the location may be incremented by a prime number.

Figure 2:
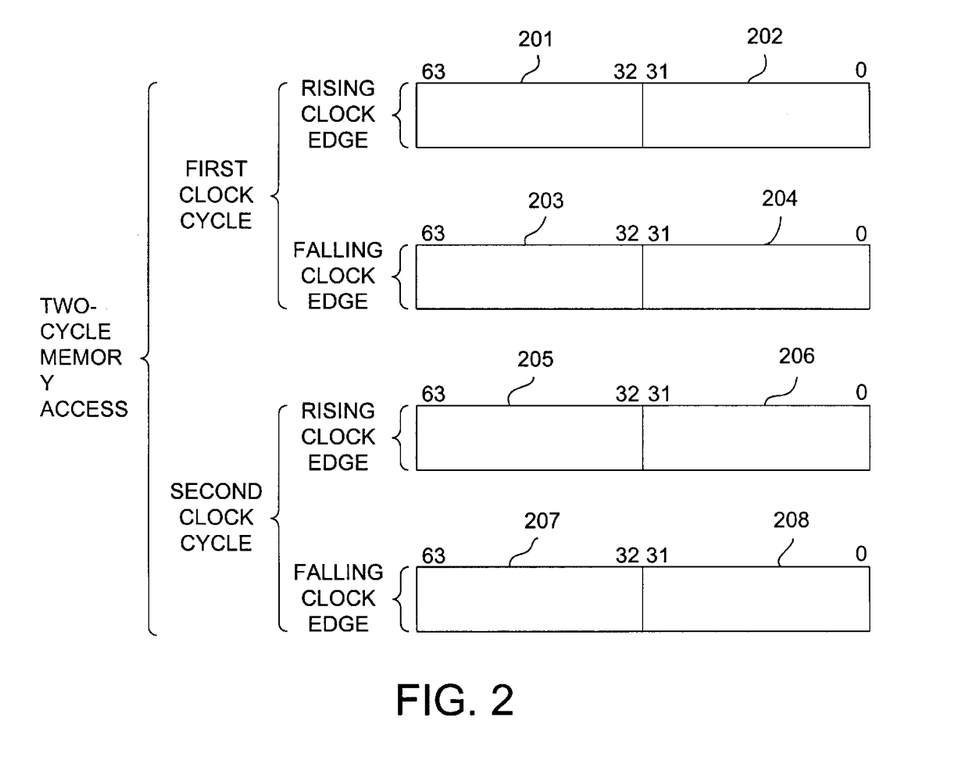
FIG. 2 is a block diagram illustrating data transferred over a data bus during a memory access.

FIG. 2 is a block diagram illustrating data transferred over a data bus during a memory access. In the example illustrated, the memory access is a two-cycle memory access. During both the first clock cycle and the second clock cycle, data are transferred on both the rising clock edge and the falling clock edge. For example, if the data bus is 64 bits wide, 64 bits, represented by lower portion 202 of 32 bits and upper portion 201 of 32 bits, are transferred on the rising clock edge of the first clock cycle. Likewise, another 64 bits, represented by lower portion 204 of 32 bits and upper portion 203 of 32 bits, are transferred on the falling clock edge of the first clock cycle.

On the rising clock edge of the second clock cycle, another 64 bits, represented by lower portion 206 of 32 bits and upper portion 205 of 32 bits, are transferred. On the falling clock edge of the second clock cycle, another 64 bits, represented by lower portion 208 of 32 bits and upper portion 207 of 32 bits, are transferred.

Thus, to obtain 128 bits of data, several approaches are possible. For example, all of the data transferred on the rising and falling edges of either the first or the second clock cycle may be obtained. Alternatively, all of the lower portions of the data may be obtained over both the first and second clock cycles. As another alternative, all of the upper portions of the data may be obtained over both the first and second clock cycles.

Figure 3:
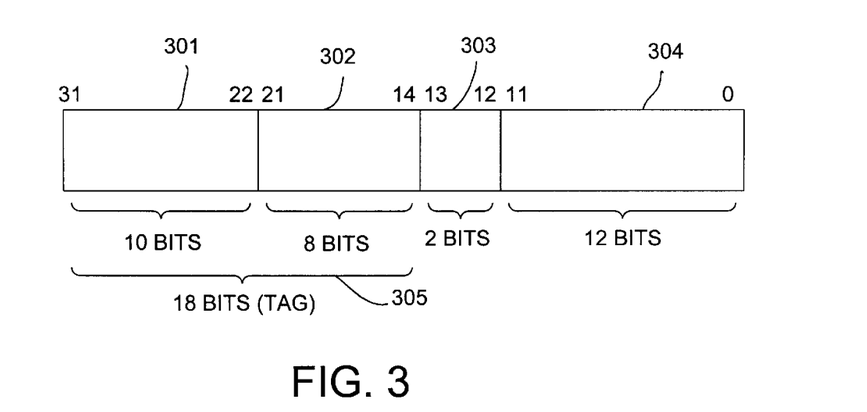
FIG. 3 is a block diagram illustrating an example of use of address bits to obtain a tag to identify a TLB entry in accordance with an embodiment of the invention.

FIG. 3 is a block diagram illustrating an example of use of address bits to obtain a tag to identify a TLB entry in accordance with an embodiment of the invention. For a 32-bit address, the least significant 12 bits A[11:0] are designated portion 304, the two bits A[13:12] are designated portion 303, the eight bits A[21:14] are designated portion 302, and the most significant 10 bits A[31:22] are designated portion 301. Assuming four-kilobyte pages, address bits A[31:12], which include portions 301, 302, and 303, are used to define the base address of a page in virtual memory. Address bits A[11:0], which are designated portion 304, define the location with that page in virtual memory. Among address bits A[31:12], address bits A[31:14], which include portions 301 and 302, are used as a tag 305 to identify a TLB entry containing four page table translations, and address bits A[13:12] (i.e., portion 303) are used to select a page table translation from among the four page table translations.

Figure 4:
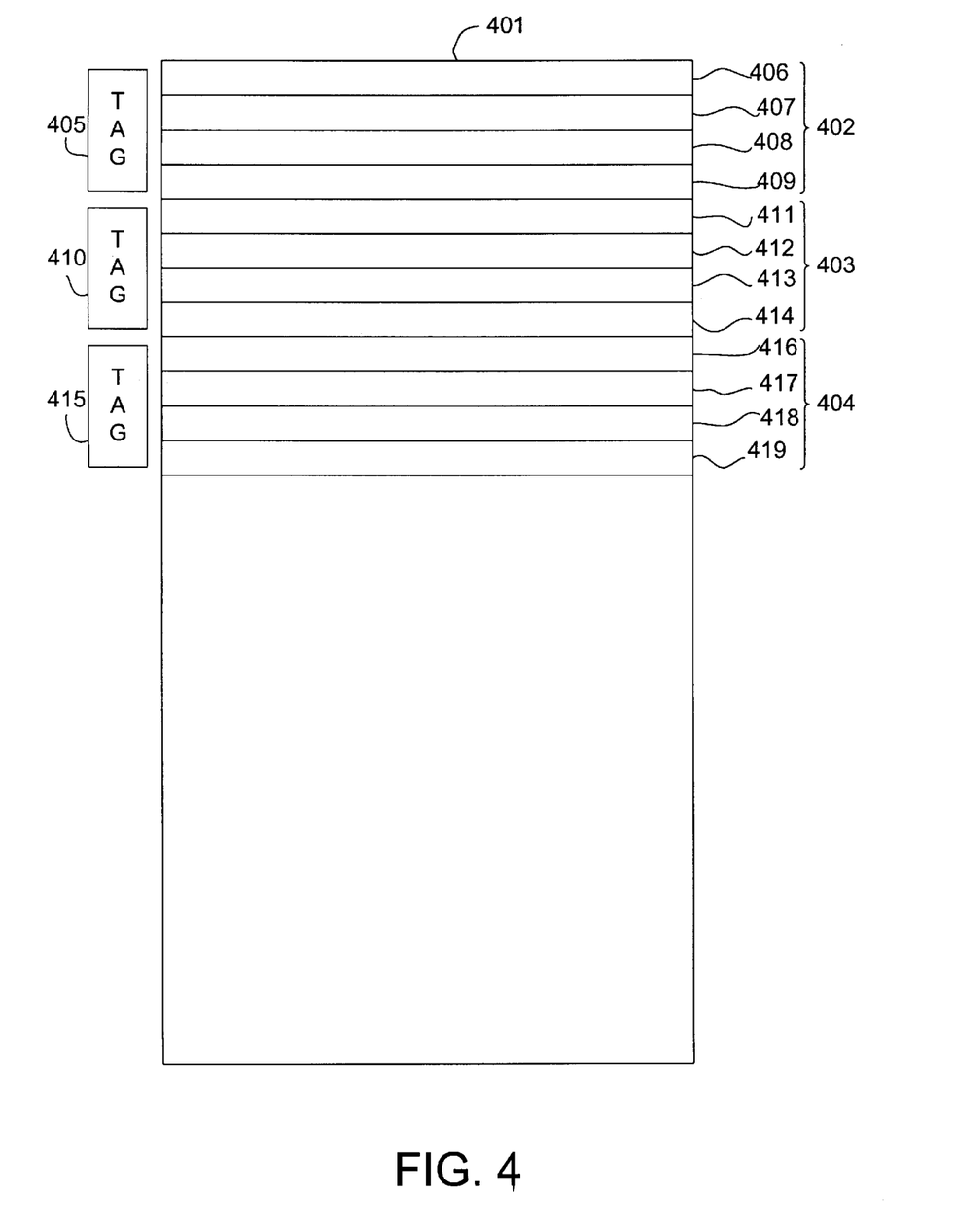
FIG. 4 is a block diagram illustrating a page table in accordance with an embodiment of the invention.

FIG. 4 is a block diagram illustrating a page table in accordance with an embodiment of the invention. Page table 401 preferably includes 1024 entries spanning four kilobytes. These entries include entry 402, entry 403, and entry 404.

Entry 402 includes page table translations 406, 407, 408, and 409. Entry 403 includes page table translations 411, 412, 413, and 414. Entry 404 includes page table translations 416, 417, 418, and 419. Entry 402 is identified by tag 405. Entry 403 is identified by tag 410. Entry 404 is identified by tag 415.

Figure 5:
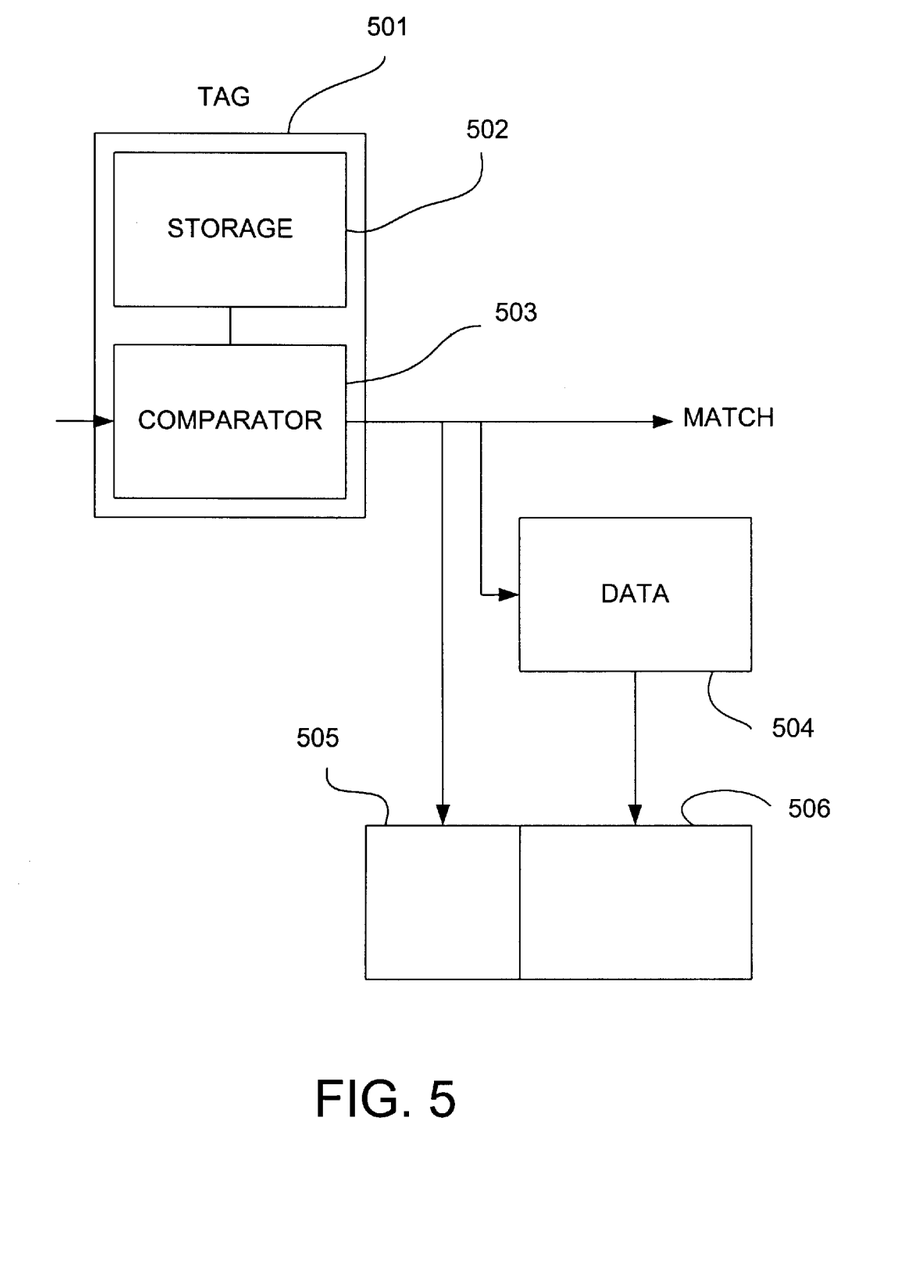
FIG. 5 is a block diagram illustrating apparatus for identifying a TLB entry by tag in accordance with an embodiment of the invention.

FIG. 5 is a block diagram illustrating apparatus for identifying a TLB entry by tag in accordance with an embodiment of the invention. A tag request is provided to tag processor 501. Tag processor 501 includes storage 502 and comparator 503. Comparator 503 compares the tag request to tags stored in storage 502 and provides a match output indicating whether a tag match has occurred. If a tag match has occurred, data 504 corresponding to the tag match is obtained. An output including match indication 505 and data output 506 is provided, with matching indication 505 derived from the match output and data output 506 derived from data 504.

Figure 6:
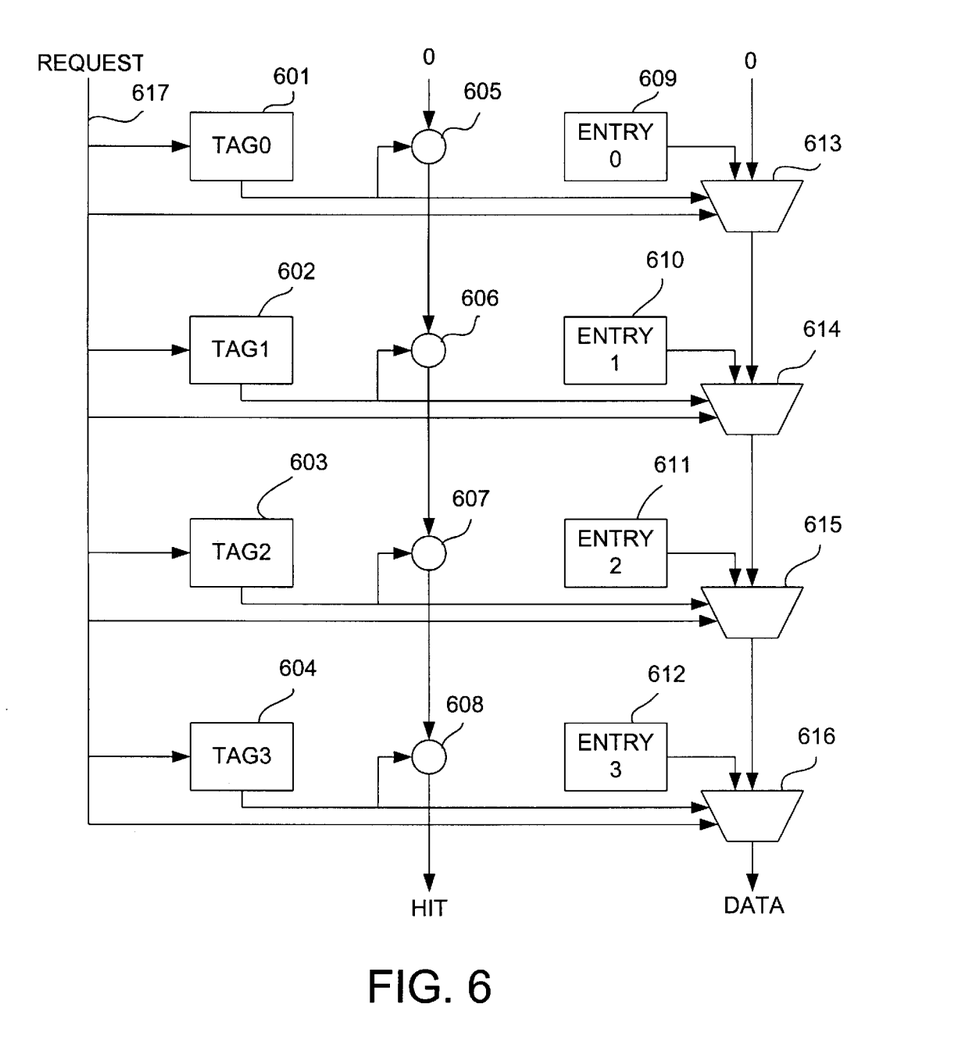
FIG. 6 is a block diagram illustrating apparatus for identifying a page table translation of a TLB entry by tag in accordance with an embodiment of the invention.

FIG. 6 is a block diagram illustrating apparatus for identifying a page table translation of a TLB entry by tag in accordance with an embodiment of the invention. The 18 most significant bits of request 617 are applied to tag comparator 601, tag comparator 602, tag comparator 603, and tag comparator 604. The two least significant bits of request 617 are applied to multiplexer 613, multiplexer 614, multiplexer 615, and multiplexer 616. A comparison output of tag comparator 601 is applied to OR gate 605 and to multiplexer 613. A comparison output of tag comparator 602 is applied to OR gate 606 and to multiplexer 6 14. A comparison output of tag comparator 60 3 is applied to OR gate 607 and to multiplexer 615. A comparison output of tag comparator 604 is applied to OR gate 608 and to multiplexer 616.

A null input is applied to OR gate 605. The output of OR gate 605 is applied to OR gate 606. The output of OR gate 606 is applied to OR gate 607. The output of OR gate 607 is applied to OR gate 608. The output of OR gate 608 provides a hit indication.

Entry 609 is provided to one input of multiplexer 613, while a null input is applied to another input of multiplexer 613. Entry 610 is provided to one input of multiplexer 614, while the output of multiplexer 613 is provided to another input of multiplexer 614. Entry 611 is provided to one input of multiplexer 615, while the output of multiplexer 614 is provided to another input of multiplexer 615. Entry 612 is provided to one input of multiplexer 616, while the output of multiplexer 615 is provided to another input of multiplexer 616. The output of multiplexer 616 provides a data output.

Figure 7:
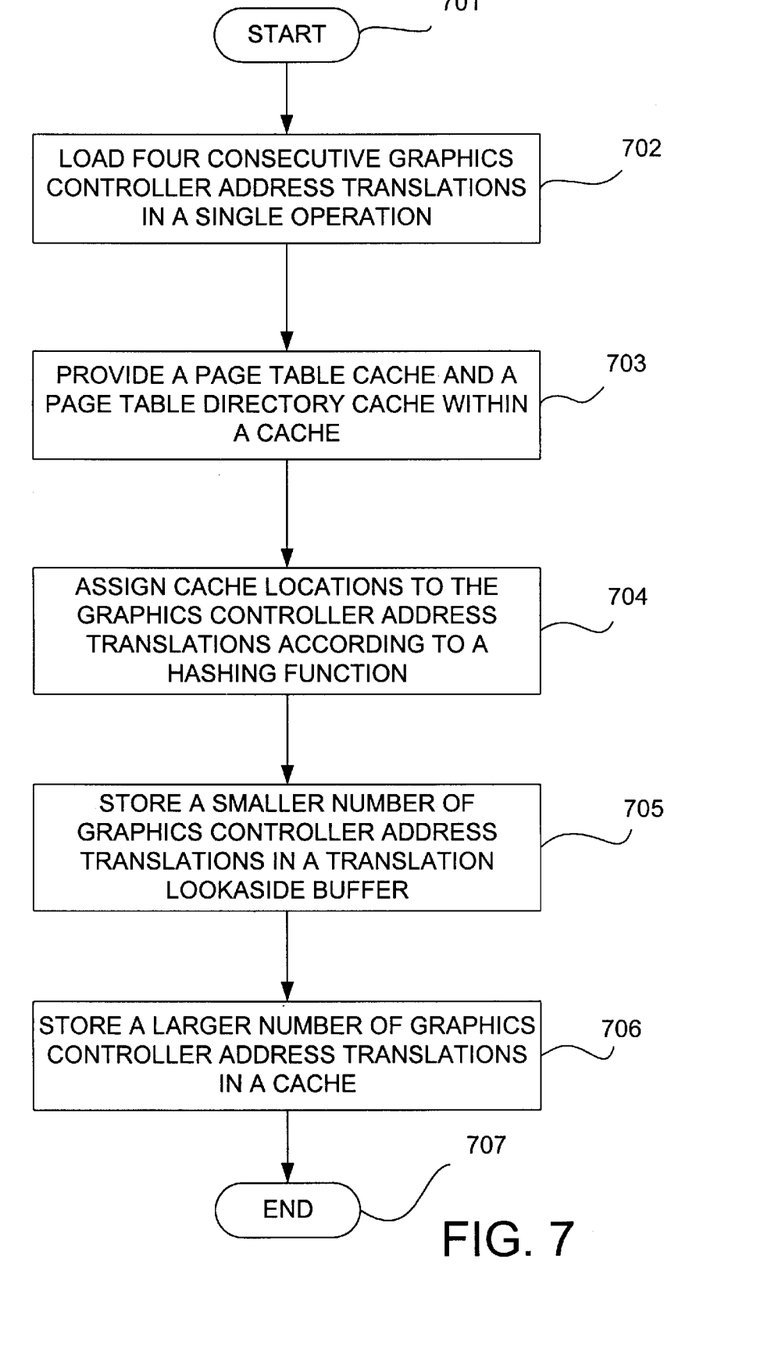
FIG. 7 is a flow diagram illustrating a process according to an embodiment of the invention.

FIG. 7 is a flow diagram illustrating a process according to an embodiment of the invention. The process begins in step 701 and continues in step 702. In step 702, four consecutive graphics controller address translations are loaded in a single operation. In one embodiment of the invention, the four consecutive graphics controller address translations cumulatively consist of 128 bits. In step 703, a page table cache and a page table directory cache are provided within a cache. In step 704, cache locations are assigned to the graphics controller address translations according to a hashing function. In step 705, a smaller number of graphics controller address translations is stored in a TLB. In step 706, a larger number of graphics controller address translations is stored in a cache. The larger number of graphics controller address translations may include page table entries and page table directory entries. In step 707, the process ends.

Accordingly, a method and apparatus for improving performance of an accelerated graphics port (AGP) device has been described. It should be understood that the implementation of other variations and modifications of the invention in its various aspects will be apparent to those of ordinary skill in the art, and that the invention is not limited by the specific embodiments described. For example, the invention may be practiced with different memory, TLB, cache, and AGP device configurations and/or with variation of the number bits, bytes, entries, etc. It is therefore contemplated to cover by the present invention, any and all modifications, variations, or equivalents that fall within the spirit and scope of the basic underlying principles disclosed and claimed herein.

What is claimed is:

1. Apparatus for improving performance of an accelerated graphics port (AGP) device comprising:
    a graphics controller;
    a translation lookaside buffer operatively coupled to the graphics controller to store a smaller number of graphics controller address translations that includes a plurality of translation lookaside buffer entries, each of the plurality of translation lookaside buffer entries being associated with a corresponding one of a plurality of tags wherein each of the plurality of translation lookaside buffer entries includes a plurality of the graphics controller address translations;
    a cache operatively coupled to the translation lookaside buffer to store a larger number of the graphics controller address translations; and
    a memory operatively coupled to the cache to store the graphics controller address translations.

2. The apparatus of claim 1 further comprising:
    a central processing unit (CPU) coupled to the translation lookaside buffer; and
    a peripheral bus controller coupled to the translation lookaside buffer.

3. The apparatus of claim 1 wherein the graphics controller causes the translation lookaside buffer to load a subsequent graphics controller address translation of the graphics controller address translations while a first graphics controller address translation of the graphics controller address translations is being loaded.

4. The apparatus of claim 1 wherein the larger number of graphics controller address translations is stored in the cache according to a mapping function.

5. The apparatus of claim 4 wherein the smaller number of graphics controller address translations is stored in the translation lookaside buffer according to the mapping function, thereby allowing the cache and the translation lookaside buffer to share a common storage structure.

6. A method for improving performance of an accelerated graphics port (AGP) device comprising the steps of:
    storing a smaller number of graphics controller address translations in a translation lookaside buffer;
    storing a larger number of the graphics controller address translations in a cache;
    loading multiple consecutive graphics controller address translations in a single operation; and
    assigning a tag to the multiple consecutive graphics controller address translations.

7. The method of claim 6 further comprising the step of:
    providing within the cache a page table cache and a page table directory cache.

8. The method of claim 6 wherein the larger number of-graphics controller address translations include page table entries and page table directory entries.

9. The method of claim 8 further comprising the step of:
    assigning cache locations to the graphics controller address translations according to a mapping function.

10. The method of claim 6 further comprising the step of:
    assigning cache locations to the graphics controller address translations according to a mapping function.

11. A program storage device readable by a machine, the program storage device tangibly embodying a program of instructions executable by the machine to perform steps for improving performance of an accelerated graphics port (AGP) device included in the machine, the steps comprising:
    storing a smaller number of graphics controller address translations in a translation lookaside buffer;
    storing a larger number of the graphics controller address translations in a cache;
    loading multiple consecutive graphics controller address translations in a single operation; and
    assigning a tag to the multiple consecutive graphics controller address translations.

12. The program storage device of claim 11 wherein the steps further comprise:
    providing within the cache a page table cache and a page table directory cache.

13. The program storage device of claim 11 wherein the larger number of graphics controller address translations include page table entries and page table directory entries.

14. The program storage device of claim 13 wherein the steps further comprise:
    assigning cache locations to the graphics controller address translations according to a mapping function.

15. The program storage device of claim 11 wherein the steps further comprise:
    assigning cache locations to the graphics controller address translations according to a mapping function.

* * * * *